United States Patent [19]

Fisher, II et al.

[11] 4,277,651
[45] Jul. 7, 1981

[54] TELEPHONE DIALER

[75] Inventors: Theodore H. Fisher, II, Sparks, Nev.; Richard J. Cusimano, Jamestown, N.Y.

[73] Assignee: Basic Incorporated, Cleveland, Ohio

[21] Appl. No.: 942,051

[22] Filed: Sep. 13, 1978

[51] Int. Cl.³ .......................................... H04M 1/274
[52] U.S. Cl. ........................... 179/90 B; 179/90 BD; 179/71 R
[58] Field of Search ............. 179/90 B, 90 A, 90 AN, 179/90 BD, 90 CS, 90 K, 2 DP, 147, 7.1 R, 7.1 TP; 58/152 T

[56] References Cited

U.S. PATENT DOCUMENTS

| | | | |
|---|---|---|---|
| 3,670,111 | 6/1972 | Bukosky et al. | 179/90 BD |
| 3,885,108 | 5/1975 | Zock | 179/90 B |
| 3,920,926 | 11/1975 | Lenaerts et al. | 179/90 AN |
| 3,932,709 | 1/1976 | Hoff et al. | 179/90 B |
| 4,011,414 | 3/1977 | Warren | 179/90 B |
| 4,039,761 | 8/1977 | Nicoud et al. | 179/90 B |
| 4,119,810 | 10/1978 | Marin et al. | 179/90 B |
| 4,122,304 | 10/1978 | Mallien | 179/90 B |
| 4,122,308 | 10/1978 | Weinberger et al. | 179/7.1 R |
| 4,164,630 | 8/1979 | Brodbeck | 179/90 B |

FOREIGN PATENT DOCUMENTS

| | | | |
|---|---|---|---|
| 2647097 | 4/1978 | Fed. Rep. of Germany | 179/147 |
| 1109758 | 4/1968 | United Kingdom | 179/147 |
| 1219547 | 1/1971 | United Kingdom | 179/90 B |

Primary Examiner—Gerald L. Brigance
Attorney, Agent, or Firm—Maky, Renner, Otto & Boisselle

[57] ABSTRACT

The present invention provides both repertory and abbreviated dialing functions in a telephone dialer that facilitates telephone dialing operation. In particular, by pressing an enabling key the system is enabled for automatic dialing operation to dial a desired telephone number upon selection of a single repertory key or, for example, two keys from the key pad, which establishes coded information that effects automatic dialing operation of the desired telephone number. According to a preferred embodiment of the invention electrical circuitry for the telephone dialer is controlled by a microprocessor, or the like, which includes a central processor unit (CPU). On-hook dialing, telephone and/or speaker muting during dialing and unmuting while waiting for access to a line, security of stored telephone information and dialer use, and adaptability of the dialer to different telephone equipment having different dialing pulse formats may be included in the telephone dialer.

23 Claims, 15 Drawing Figures

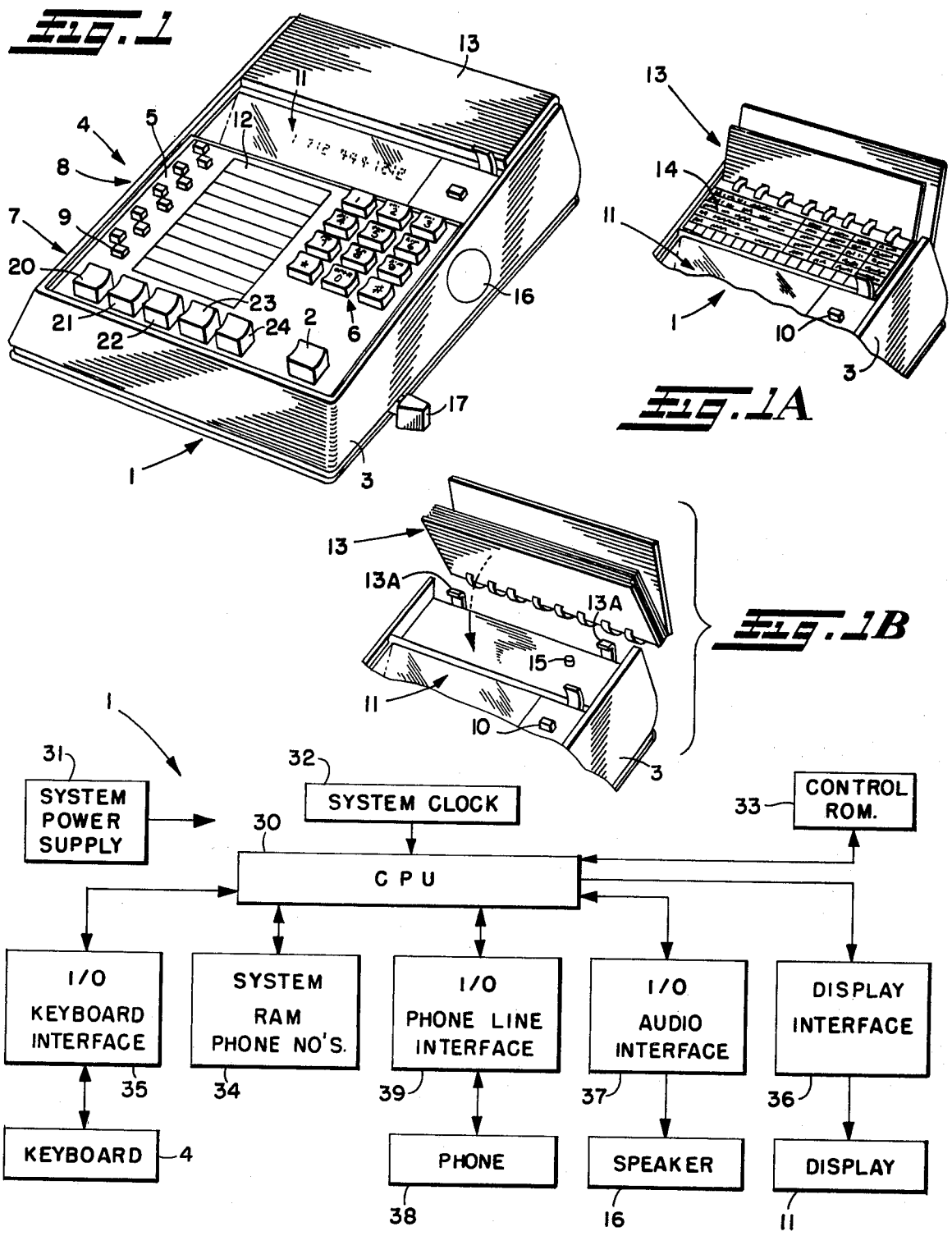

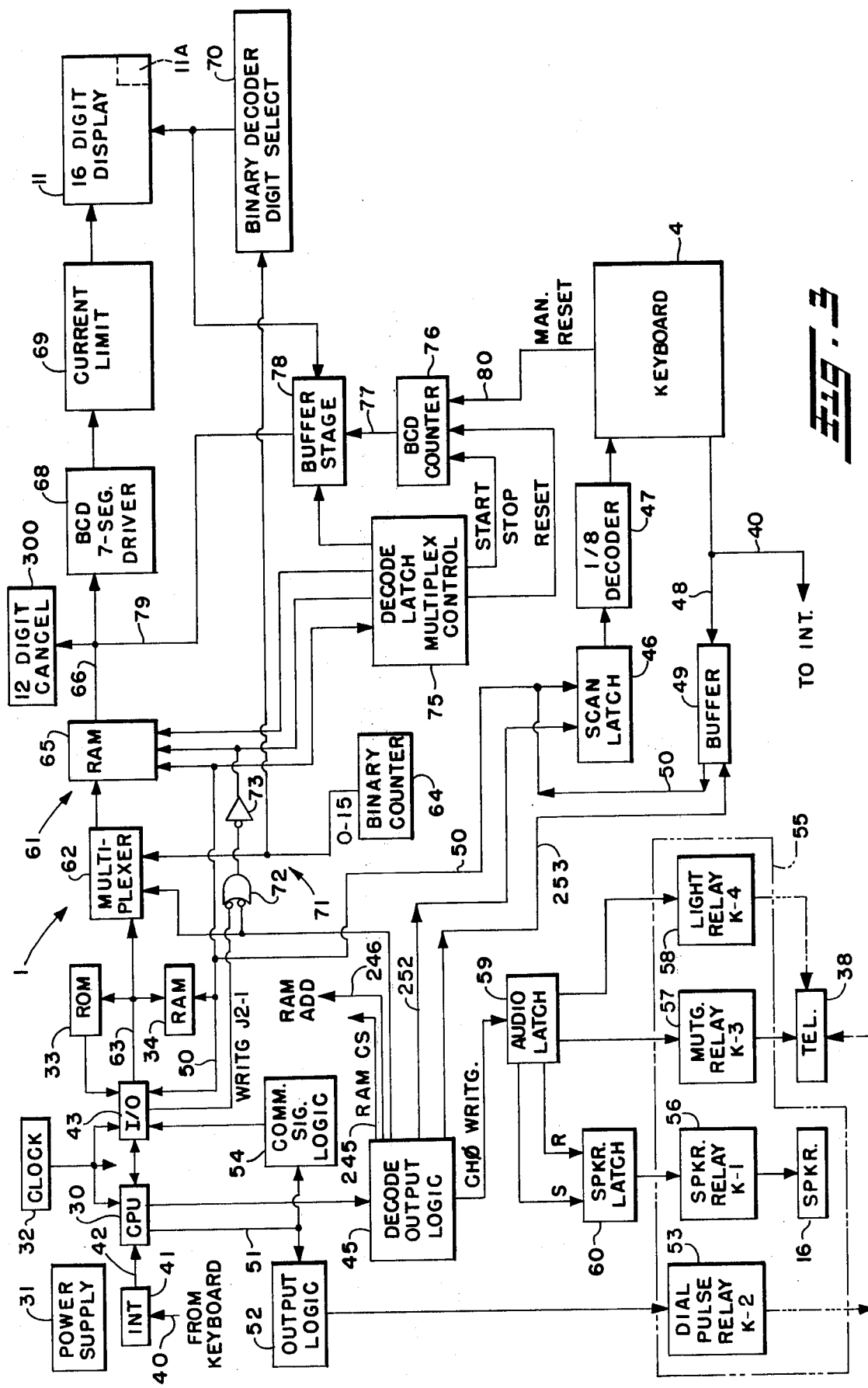

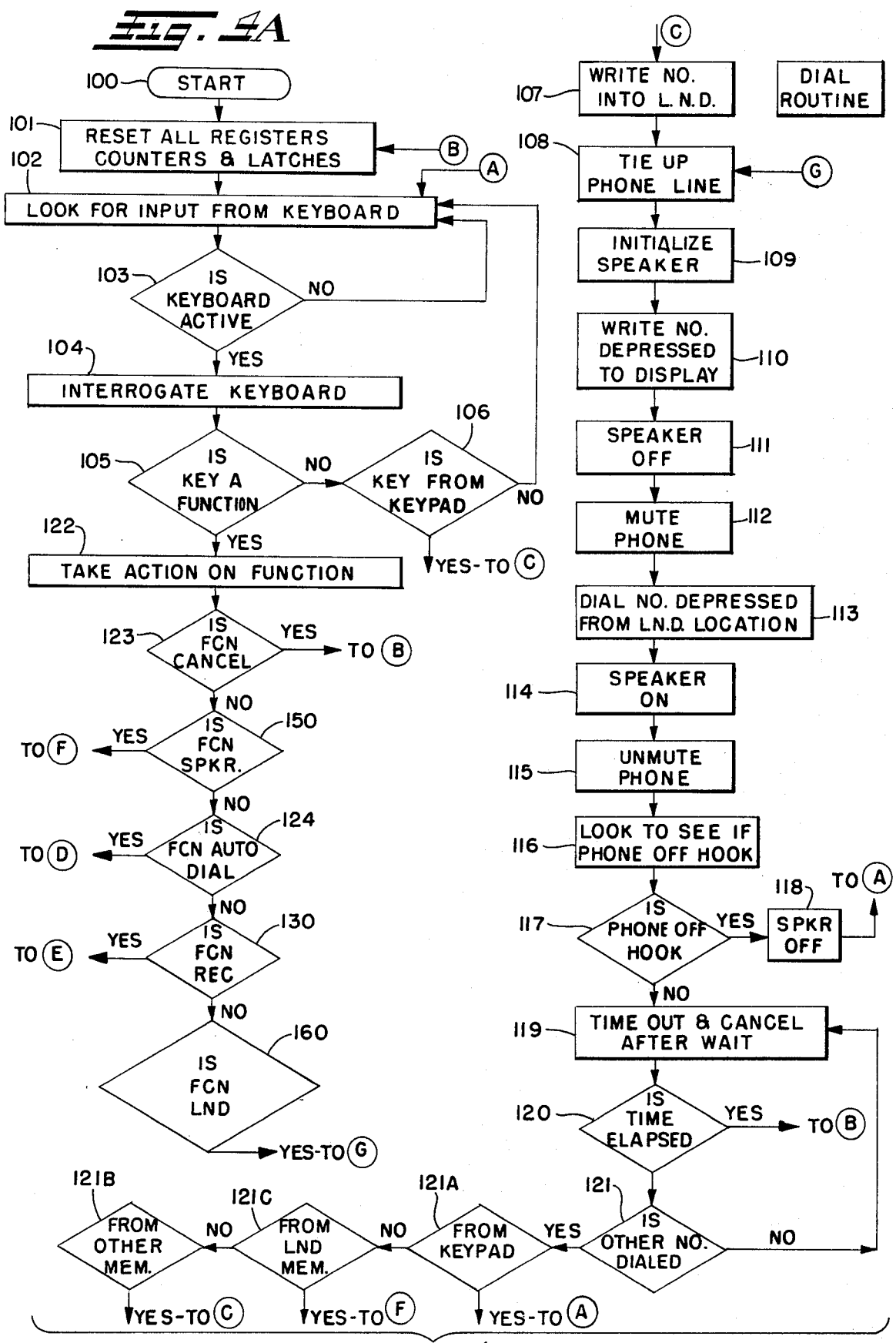

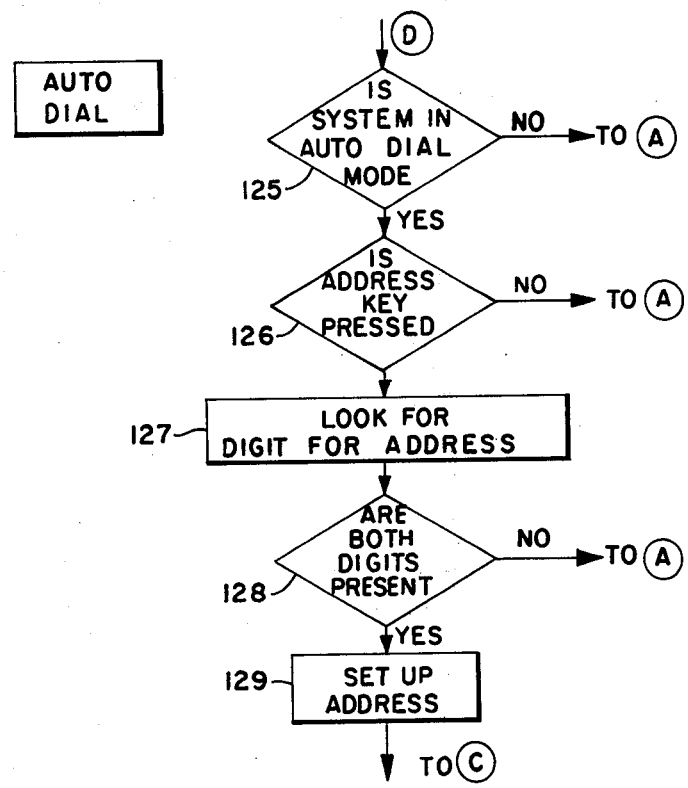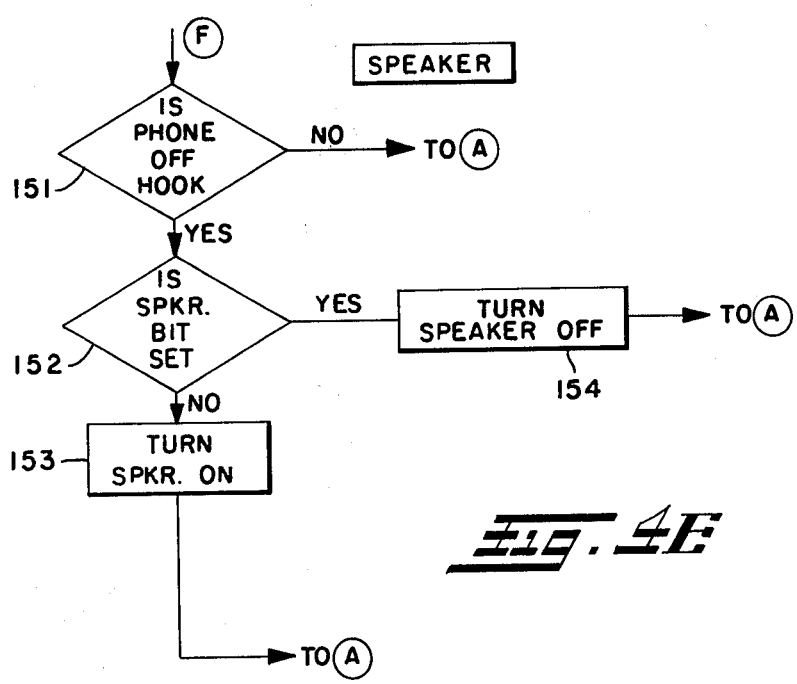

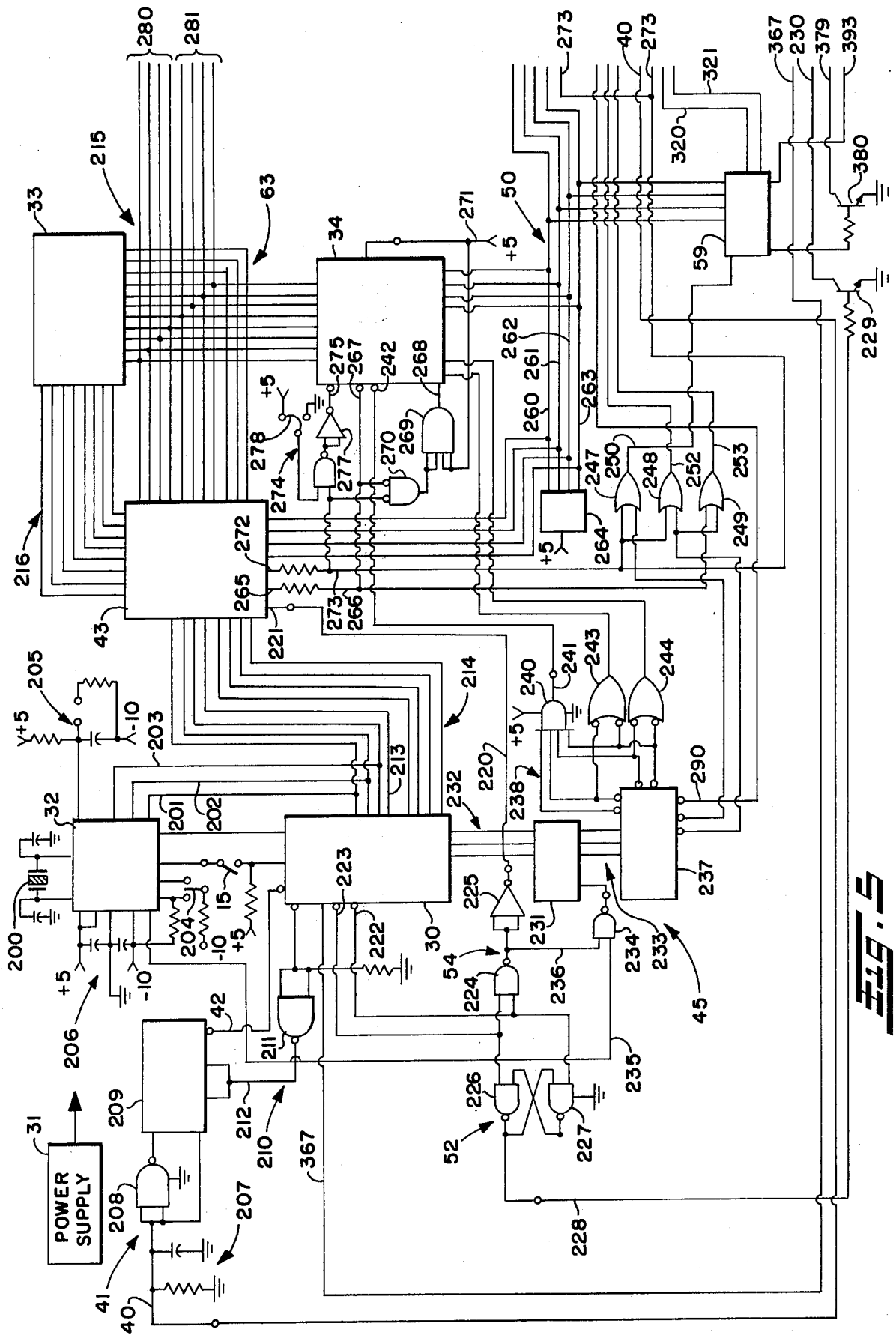

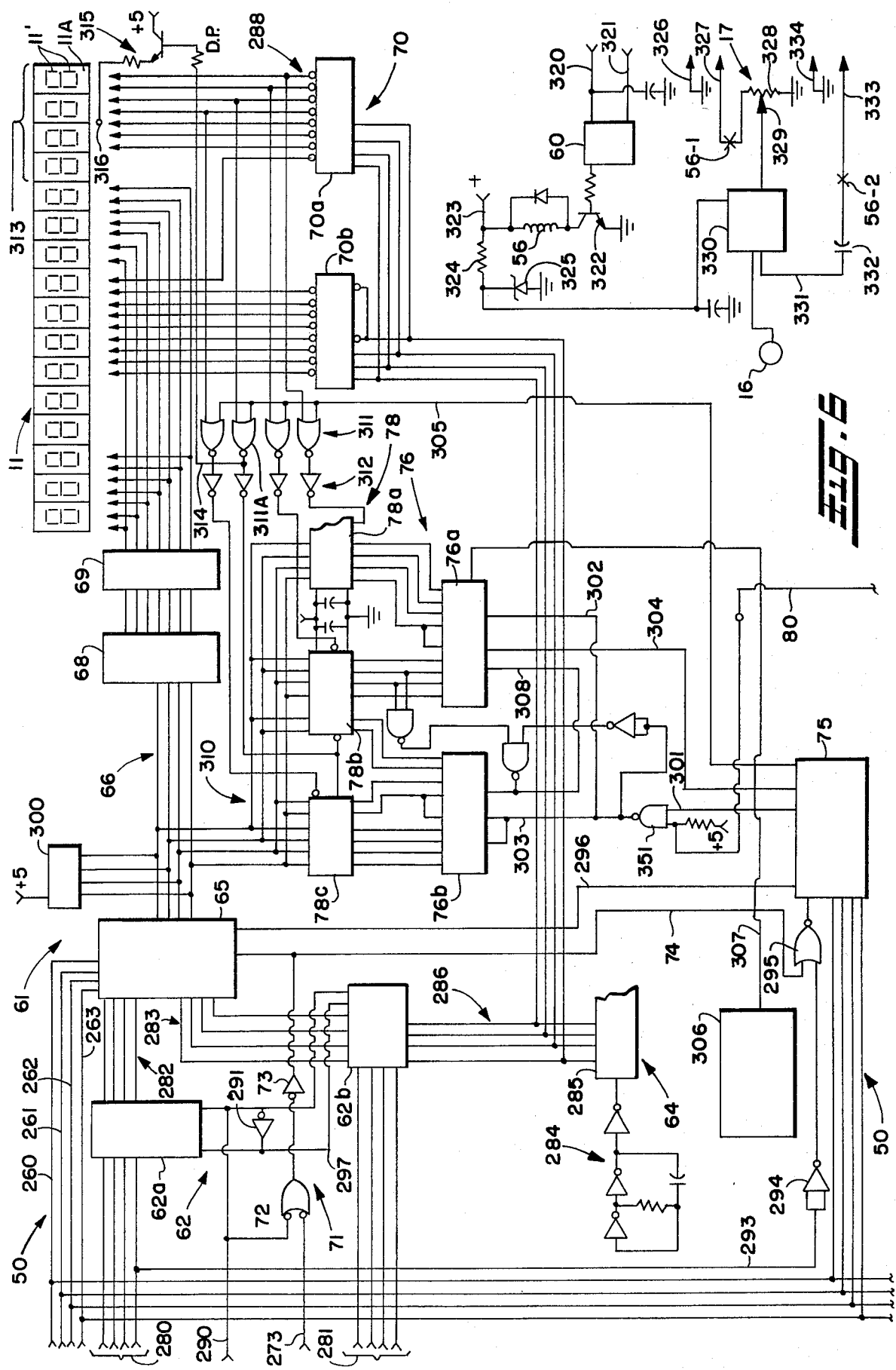

TELEPHONE DIALER

TECHNICAL FIELD

The present invention relates generally to telephone dialers and, more particularly, to dialing systems for telephone equipment. Broadly, the invention is a repertory type dialer that can be selectively enabled by pressing one or several keys (buttons) to cause automatic dialing of a telephone number.

BACKGROUND OF PRIOR ART

To facilitate dialing telephone numbers, which usually include seven digits for local telephone numbers, ten or eleven digits for long distance telephone numbers, and even more digits for international telephone numbers, for example, repertory dialing systems have been developed, such as the type manufactured and/or sold by Western Electric under the trademark "Touch-A-Matic". Typical repertory dialers, such as the "Touch-A-Matic" brand store in memory several telephone numbers and selectively, upon pressing a respective repertory key, read out respective telephone numbers to effect an automatic telephone dialing function. The "Touch-A-Matic" repertory dialer also has a last number dialed feature to re-dial the last number that was manually dialed via the key pad on the dialer. The key pad is the typical array of ten or twelve keys found on a conventional push button type telephone, as opposed to the over-all keyboard of the repertory dialer which includes the key pad digit keys, the repertory keys, and/or other function generating keys, such as the last number dialed function generating key. In past repertory dialers there has been no need to store in the last number dialed memory numbers other than those having been manually dialed from the key pad, for any number stored in the repertory memory could be recalled simply by pushing a single repertory key.

There are a number of disadvantages to conventional repertory dialers. For example, the size of the repertory dialer housing, keyboard, and face plate covering the keyboard become exceedingly large as the repertory capacity, i.e. the number of telephone numbers that can be dialed by pushing single respective repertory keys, increases. As a corrollary, the number of telephone numbers that can be stored in conventional repertory dialers is limited to the physical size of the piece of equipment and is not expandable. Moreover, many, if not all, of the prior repertory dialers have substantially fixed circuitry and operation thereof, which minimizes their over-all utility.

BRIEF SUMMARY OF INVENTION

The present invention provides both repertory and abbreviated dialing functions in a telephone dialer that facilitates telephone dialing operation. In particular, by pressing an enabling key the system is enabled for automatic dialing operation to dial a desired telephone number upon selection of a single repertory key or, for example, two keys from the key pad, which establishes coded information that effects automatic dialing operation of the desired telephone number. Such combination of repertory and abbreviated dialing is accomplished in accordance with the present invention by storing each telephone number selected for dialing, either via a repertory key or an abbreviated dialing key pair, in the last number dialed location during the dialing operation.

According to a preferred embodiment of the invention electrical circuitry for the telephone dialer is controlled by a microprocessor, or the like, which includes a central processor unit (CPU). Program control information for the CPU is stored in one memory for interacting with the CPU in a conventional manner in response, for example, to externally input function information to cause operation, such as automatic dialing, telephone number record, telephone number and/or timer display. At plural addressable locations of another memory respective telephone numbers are stored for access by the CPU to read out the same to effect automatic dialing operation. The latter memory, moreover, may be conveniently expandable, as desired, without substantial enlargement of the system housing, keyboard or face plate, in a facile manner, for example even by the consumer or user, whereby the telephone dialer is a compact unit which may be conveniently placed in minimum space beside a conventional telephone.

According to a number of additional aspects of the present invention, as will be described in detail below, on-hook dialing, telephone and/or speaker muting during dialing and unmuting while waiting for access to a line, security of stored telephone information and dialer use, and adaptability of the dialer to different telephone equipment having different dialing pulse formats may be included in the telephone dialer.

In accordance with another aspect of the invention, during dialing the telephone number being dialed is visually displayed and when the called telephone is answered the display shows the length of time of the telephone conversation.

With the foregoing in mind, it is a primary object of the present invention to facilitate telephone dialing.

Another object is to combine true repertory and abbreviated dialing functions in a single telephone dialer and utilizing such combination to provide a relatively large capacity system in relatively small space.

An additional object is to provide in a telephone dialer a visual display of information concerning the telephone number dialed and/or the elapsed time of a telephone conversation.

A further object is to provide on-hook dialing capability in a telephone dialer in accordance with the present invention.

Still another object is to provide security of access to and use of a telephone dialer.

Still a further object is to utilize microprocessor-based circuitry to effect multiple function operation of a telephone dialer.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF DRAWINGS

In the annexed drawings:

FIG. 1 is a perspective view of a telephone dialer in accordance with the present invention;

FIG. 1A is a partial view of the telephone dialer showing the index thereof;

FIG. 1B is a partial exploded view of the telephone dialer and the removed index;

FIG. 2 is a block diagram depicting the interrelationship of the CPU with other portions of the telephone dialer;

FIG. 3 is a schematic block diagram illustrating in some detail the several electrical portions of the telephone dialer;

FIGS. 4A–4E are program control flow chart diagrams illustrating the interaction of the various parts of the telephone dialer;

FIG. 5 is a schematic electric circuit diagram of the CPU and peripheral circuitry thereof;

FIG. 6 is a schematic electric circuit diagram of the display circuitry and speaker circuitry;

FIG. 8 is a schematic electric circuit diagram of an interface circuit for coupling the telephone dialer with conventional telephone equipment, such as a typical telephone.

DETAILED DESCRIPTION OF INVENTION

Figure 4D:
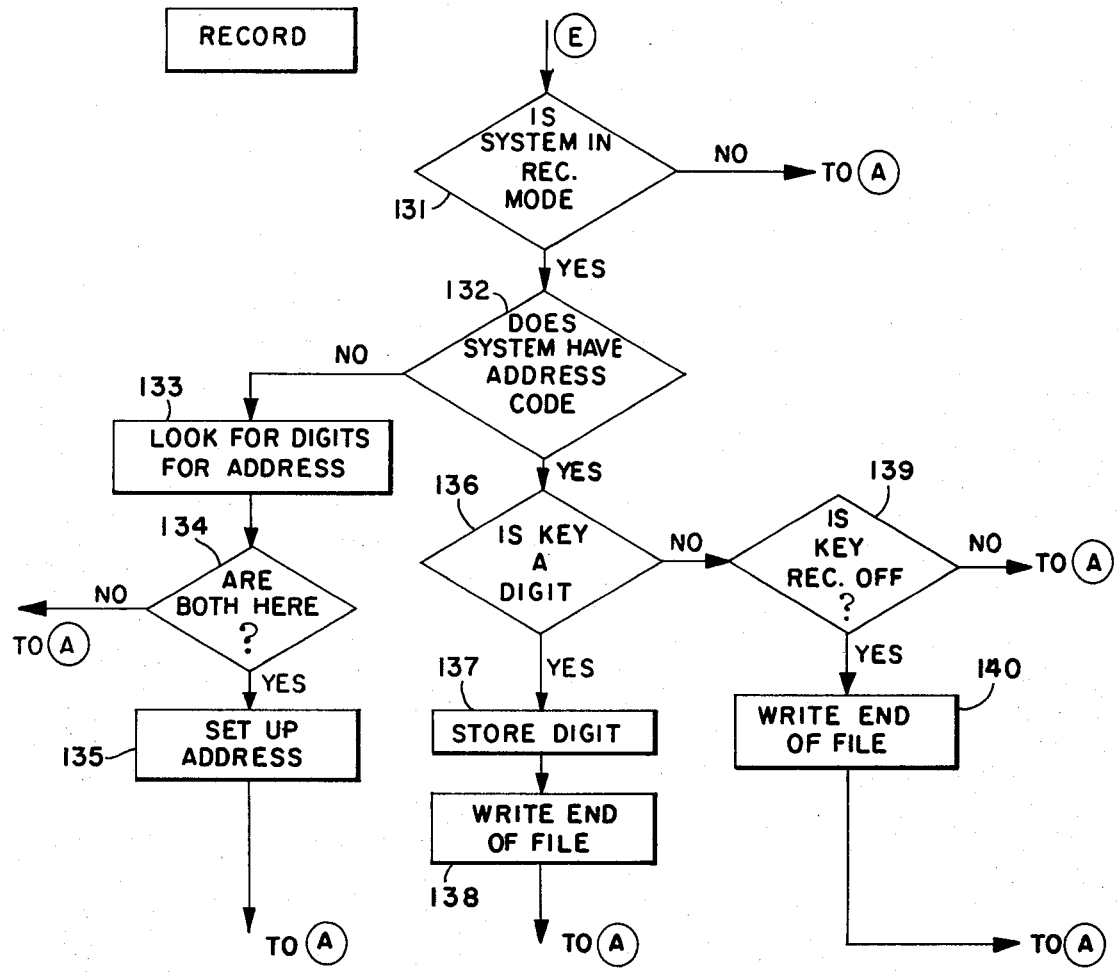

Referring now in detail to the drawings, wherein like reference numerals designate like parts in the several figures, and initially to FIG. 1, a telephone dialer in accordance with the invention is generally indicated at 1. The telephone dialer 1 is automatic in the sense that after it is enabled by pressing the automatic dialing enabling key 2 and selecting a repertory key or an abbreviated dialing code, a telephone number will automatically be dialed.

The repertory dialer 1 includes a housing or case 3 of relatively compact size. A keyboard 4 is exposed in the face plate 5 of the case 3 and includes a conventional pushbutton telephone style key pad 6 with twelve digit keys, six function generating keys 7, including the enabling key 2, nine repertory keys 8, a last number dialed recall key 9, a timer reset 10, and a visual display 11. The electrical connections made by pressing each of the respective keys of the keyboard 4 are illustrated in FIG. 7B.

Adjacent each repertory key 8 are respective spaces 12 in which the name of the person to be called by pressing of an adjacent repertory key may be handwritten or typewritten. Moreover, a selectable index 13 is attached at the upper end of the face plate 5 on which additional name and respective abbreviated dialing code information may be handwritten or typewritten. As is illustrated in FIGS. 1A and 1B, the index 13 preferably is of the flip-open type providing access to the multiple pages 14 therein and is removable from the telephone dialer case 3. Although not included in the best mode of the invention, a switch 15, such as a microswitch, a magnetically responsive switch, etc., which senses removal of the index from the case, may be used to disable the telephone dialer 1 whenever the index is not properly in its place. Molded mechanical fastener clips 13A or, alternatively, magnetic, mechanical, Velcro-type, and like fasteners may be used to secure the index 13 to the case 3. A resilient lock 13B holds the index 13 closed and may be bent foward to allow access to the index.

The telephone dialer 1 also includes a one-way speaker 16, although a two-way speaker also may be used, if desired, and a volume control 17. The speaker 16 permits a user of the telephone dialer 1 to listen for a dial tone indicating that the telephone dialer has obtained access to a telephone line and the volume control 17 adjusts the speaker volume. The speaker 16 also provides audible information, the same as the earpiece, i.e. the handset speaker, of a telephone, to indicate to a user that a called telephone has been answered; in fact, the speaker 16 may be selectively operated by a user of the telephone dialer 1 to enable others in a room to listen to the voice of the distant called party.

The enabling key 2, when pressed, enables the telephone dialer 1 automatically to dial a selected telephone number. Such telephone number is selected by pressing one of the nine repertory keys 8, which ordinarily would be used to dial the nine most frequently called telephone numbers. Alternatively, a telephone number may be selected by sequentially pressing preferably two, or more, if desired, digit keys from the key pad 6 to set up an abbreviated dialing code representing a respective telephone number, which may be identified within the index 13. It will be appreciated that expansion of the capacity of the telephone dialer 1 can be effected with relative facility, for example, by increasing the number of abbreviated dialing codes, which would not involve any change in the keyboard 4 or face plate 5, and an increase in the memory capacity in the electronics within the case 3, such increase also generally not requiring any change in the size of the telephone dialer 1.

The visual display 11 will display the telephone number dialed automatically by the telephone dialer 1 as well as any telephone number that is dialed manually from the key pad 6. Moreover, when a called telephone is answered, the visual display 11 will display the duration of the telephone connection thereto, i.e. the length of conversation. A timer reset key 10 may be activated to reset to zero time the visual display 11 and may be used, for example, in connection with person to person telephone calls for which the telephone company does not charge the customer until the selected party arrives at the called telephone.

The function generating keys 7 include record on and record off keys 20, 21, wait key 22, cancel key 23, speaker key 24, and enabling key 2.

To record a telephone number in an addressable memory location in the telephone dialer 1, the record on key 20 is pressed and a memory location is addressed by pressing one of the repertory keys 8 or a two-digit abbreviated dialing code in the key pad 6. The several digits of the telephone number to be stored then are tapped out in normal order on the key pad 6, and the record off key 21 is pressed to complete the recording operation. Thereafter, pressing of the enabling key 2 and of the appropriate repertory or abbreviated dialing code digit key(s) will recall that stored telephone number to effect dialing of the same through the telephone equipment, not shown, associated with the telephone dialer 1.

Whenever the telephone dialer 1 is used in connection with a private branch exchange (PBX) or a private automatic branch exchange (PABX), in which it is usually necessary to dial an access code, such as the digit "9", and to wait briefly for seizure of an outside trunk line, the wait key 22 may be used to provide a waiting period to obtain such access. Therefore, when recording a telephone number in an addressable memory location of the telephone dialer 1 the record on key 20 is pressed; the selected memory location is addressed, as above; the access code, say the digit "9" is pressed on the key pad 6; the wait key 22 is pressed one or more times, each pressing providing a wait period of, for example, two to four seconds, in order to allow sufficient time for seizure of an outside line; the telephone number digits are tapped into the key pad 6 in usual manner; and the record off key 21 is pressed. During automatic dialing operation when it is necessary to seize an outside line via an access code, as just described, the speaker 16 oridinarily will be muted except during the waiting period. Therefore, during the waiting period, while the speaker is unmuted, the speaker 16 will provide an audible output of a typical dial tone when an outside line has been seized, indicating the same to the user.

Cancel key 23 may be pressed to cancel a dialing or recording operation, even in the midst thereof, to disconnect the telephone dialer 1 and its associated telephone equipment from a seized telephone line, unless the telephone is off-hook. The speaker key 24 may be pressed to effect connection of the speaker 16 in parallel with the associated telephone handset speaker so that the voice of a dialed party at a remote telephone may be heard.

Turning now more particularly to FIG. 2, the several components of the telephone dialer system 1 are schematically illustrated. A central processor unit (CPU) 30, which may, for example, a conventional microprocessor, such as the Model No. 8080 or Model No. 4040 microprocessors manufactured and sold by Intel Corporation. A conventional regulated power supply 31 provides electrical power to the several elements of the system 1. The power supply 31 normally is energized by input power from the utility company by connecting the same to a typical wall socket; however, preferably the power supply 31 has a supplemental battery continuously charged by a conventional trickle charger in order to continue a supply of power to the elements of the telephone dialer, usually for several hours, in the event of a main power failure. A system clock 32, which preferably is a conventional clock signal generating circuit utilized in microprocessor circuitry produces the necessary clock signals for synchronizing and operating functions in the microprocessor circuitry and the other elements associated therewith. For example, the system clock 32 may be a conventional crystal controlled oscillator that generates two phase non-overlapping clock signals of the same frequency.

A read only memory (ROM) 33 provides program control information in conventional manner to the CPU 30 to control operation of the same, and a conventional random access memory (RAM) 34 provides the accessible addressable memory locations for the system 1 to store plural respective telephone numbers. The keyboard 4 is connected via input/output keyboard interface circuit 35 to the CPU 30, and the visual display 11 and speaker 16 are connected to the CPU via respective display interface and input/output audio interface circuitry 36, 37. Moreover, the telephone equipment such as a conventional telephone 38 is connected to the CPU 30 by input/output phone line interface circuitry 39, which is illustrated in greater detail in FIG. 8. Thus, it will be clear that the CPU 30 controls all of the functions, including the recording, dialing, telephone connecting, speaker and display operating functions of the telephone dialer system 1 in response to manual operation of the keyboard 4 and program control information contained in the memory 33.

Referring now to FIG. 3, a more detailed block diagram of the telephone dialer system 1 is illustrated. The CPU 30 normally remains in a quiescent state until it is interrupted by an interrupt signal upon pressing of a key on the keyboard 4. When a key is pressed, a signal is delivered along line 40 to an interrupt circuit 41 which creates an interrupt signal that is delivered on line 42 to the CPU. The CPU 30 then operates through its input/output circuit 43 and a decode output logic circuit 45 to cause a scanning latch circuit 46 and a decoder circuit 47 to interrogate the keyboard 4 to see which key has been pressed. When the pressed key has been found, a signal produced on line 48 is transmitted by a buffer circuit 49 and the system data bus 50 back to the input/output circuit 43 and CPU 30 and the CPU takes appropriate action.

To seize a telephone line the CPU 30 produces an output command signal on line 51 causing an output logic circuit 52, such as a conventional latch circuit, to energize a dial pulse relay 53 to place an impedance across the ring and tip lines at the telephone 38. To dial a telephone number, the CPU 30 pulses the command signal on line 51 so that the output logic circuit 52 produces a pulse type output which periodically pulses the dial pulse relay 53. The mentioned impedance, then, is sequentially disconnected and reconnected across the ring and tip lines to effect a dialing signal in conventional manner. A command signal logic circuit 54 also receives the command signals from line 51 to cause conventional operation of the input/output circuit 43, for example to deliver selected program control instructions from the ROM 33 to the CPU 30.

The dial pulse relay 53 is located on a telephone interface circuit 55, which is described below with reference to FIG. 8. A speaker relay 56 controls connections of the speaker 16 and a muting relay 57 controls muting and unmuting of the speaker in the telephone handset. A relay 58 controls energization and deenergization of a light at the telephone 38 to indicate, for example, when a telephone line has been seized. The CPU 30 operates the respective relays in the interface circuit 55 by signals from the decode output logic circuit 45 which operate an audio latch circuit 59 connected substantially directly to the muting relay 57 and relay 58 and, via a speaker latch circuit 60, the speaker relay 56.

The CPU 30 also controls operation of the visual display 11 to display during the dialing operation the telephone number being dialed and during the telephone conversation the duration of the same. The display 11 preferably includes sixteen discrete display elements, such as the display element 11A, and each display element may include, for example, seven individual light emitting diode segments, each of which may be selectively energized to produce intelligible information in conventional manner. The display energizing circuitry 61 is of the multiplexed type that periodically sequentially delivers energizing signals to selected ones of the segments of all of the display elements; however, only that display element which is enabled at any given time has its segments actually energized to emit light therefrom.

In the display energizing circuitry 61 a conventional multiplexer circuit 62 receives plural input signals, respectively, from the address bus 63 of the input output circuit 43, decode output logic circuit 45, and binary counter 64. Preferably the display 11 is capable of displaying sixteen total digits and the binary counter 64 is capable of counting sixteen counts from zero through fifteen. The multiplexer 62, as controlled by its input signals, then, effects storing in a RAM 65 information concerning the telephone number being dialed by the system 1. The RAM 65, accordingly, is connected to receive the input information from the system data bus 50.

When the telephone number information stored in the RAM 65 is to be displayed in the display 11, the RAM 65 is enabled in a multiplexed manner to deliver the stored information sequentially and periodically along a bus line 66 to a binary coded decimal seven-segment driver circuit 68 which in cooperation with a conventional current limiting circuit 69 directly delivers energizing signals to respective segments of all of the display elements in the display 11. The binary counter 64 controls a binary decoder digit select circuit 70 in sequence with the multiplexer 62 so that in response to the count on the binary counter 64 respective display elements of the display 11 are sequentially enabled allowing the respective segments thereof to be energized through the driver circuit 68 and current limit circuit 69. Although the display elements are multiplexed so that the various segments of respective display elements sequentially are energized and deenergized, the blinking effect occurring therein is so rapid that ordinarily it will not be discerned by a person using the system 1; rather, the information displayed by the display 11 will appear to a user to be substantially continuous information.

A logic sheet enabling circuit 71, which includes a NOR gate 72 and an inverting amplifier 73 coupled to the input/output circuit 43 and to the decode output logic circuit 45, provides controlled enabling signals to enable a decode latch multiplex control circuit to change its latched state and the RAM 65 to have information written therein. The control circuit 75 determines whether the display 11 will display the telephone number dialed or the duration of a telephone call. Upon the occurrence of a called party answering the called telephone, the control circuit 75 resets a timer. The timer includes a binary coded decimal counter 76 which produces on line 77 information representing the duration of the telephone call. The count information provided by the counter 76 may be decoded in a buffer stage 78 which, in multiplexed manner under control of the binary coder digit select circuit 70 and the decode latch multiplex control circuit 75, directly drives the display elements via the driver circuit 68 and current limit circuit 69. Preferably the time information is displayed in seconds and minutes up to a maximum of, for example, 99 minutes, 59 seconds. The decode latch multiplex control circuit 75, moreover, stops the counting in the counter 76 when the telephone call is terminated either by the called or calling party but continues operation of the display energizing circuitry 61 to maintain display of the timed duration for subsequent recording by the user. A manual reset signal may be delivered on line 80 to reset the binary coded decimal counter 76 to a zero count upon pressing of the reset key 10 on the keyboard 4.

Turning now particularly to FIGS. 4A–4E, a functional flow chart presenting the best mode of operation of the telephone dialer system 1 is illustrated. From the information presented in and described with respect to the flow chart and from the other description presented in this specification, appropriate machine language type program information may be derived by those persons having ordinary skill in the art for storage, for example, in the ROM 33 to effect over-all program control of the telephone dialer system 1.

In FIG. 4A the telephone dialer system 1 is started, block 100, upon receiving electrical power from power supply 31. The various registers, counters, latches and the like within the system 1 are then reset, block 101. Thereafter, the CPU 30 looks for input information from the keyboard 4, block 102, and as long as the keyboard remains inactive will continue in a quiescent state looking for such information, block 103. However, when a key is pressed in the keyboard 4, the CPU interrogates the keyboard, block 104, to determine whether the pressed key is a function generating one, block 105, or a digit key from the key pad 6, block 106.

The system 1 is capable of dialing a telephone number without lifting the associated telephone handset off hook simply by tapping out the appropriate sequence of digit keys in the key pad 6 in the same manner that a typical pushbutton telephone is dialed. Assuming that the system 1 is used in this direct dial mode and that a pressed digit key from key pad 6 is detected by the CPU 30. From block 106, then, the flow chart moves to point C at block 107 in the flow chart portion illustrated in FIG. 4B. At this time the CPU causes information representing the detected digit to be stored or written into a location in the last number dialed (LND) memory portion of the RAM 34. At the same time, the system 1 will tie up the phone line, block 108, by energizing the dial pulse relay 54; will initialize the speaker and handset speaker, if the phone is off hook, block 109, resetting the speaker latch 57 to energize the speaker relay so that a dialtone may be heard from the speaker 16; and will write the depressed digit to the display 11, block 110, via the multiplexer 62, RAM 65, driver circuit 68 and current limit circuit 69 in the display energizing circuitry 61. Moreover, when the system 1 is prepared to commence dialing of the pressed digit, the speaker 16 will be turned off, block 111, by setting the speaker latch circuit 57; the telephone handset speaker will be muted, if off hook, block 112, by appropriate operation of the muting relay 70; and the digit is dialed, block 113, directly by command signals on line 51 from the CPU 30 to operate the output logic latch 52 deenergizing and energizing the dial pulse relay 54. After the digit has been dialed, the system 1 turns on the speaker, block 114, unmutes the handset speaker, block 115, and looks to see whether the handset has been taken off hook, block 116. If the handset has been taken off hook, block 117, the speaker 16 is turned off, block 118, and the flow chart continues at point A at block 102 (FIG. 4A). However, if the handset is not off hook, the system 1 will enter a time out and cancel loop, block 119, where the system looks to see whether a time out period of, for example, two minutes has elapsed, block 120, before the next digit is dialed, block 121. If after the first digit key from the key pad 6 has been pressed, a subsequent digit is not pressed, after the time out period the system will proceed back to point B at block 101 (FIG. 4A) effectively resetting the entire system to a quiescent state, whereupon the telephone line is released and the system awaits further information from the keyboard 4. The same time out and cancel function occurs if the handset is not taken off hook within the time out period after a complete telephone number has been dialed regardless of whether or not the called party has answered the call. Additionally, as represented in block 121, if a subsequent digit key in the key pad 6 is pressed, the system 1 reverts to point A at block 102 (FIG. 4A) to proceed as aforesaid to complete the dialing operation as respective digits are tapped into the key pad.

Assuming at block 105 the CPU 30 detects, upon interrogating the keyboard 4, that the pressed key is a function generating key 7, then the system 1 takes action on the function, block 122. If the function is a cancel, i.e. the cancel key 23 is pressed, block 123, then the system reverts promptly to point B at block 101 to reset the system as above. However, if the function is the automatic dial function, block 124, then the flow chart passes to location D in the flow chart portion illustrated in FIG. 4C, whereupon the system 1 commences an automatic dialing routine operation, either of the repertory or abbreviated dialing type. As seen in FIG. 4C, assuming the system is in the automatic dial mode, block 125, an inquiry is made to see whether an address key has been pressed, block 126. An address key is one of the repertory keys 8 or one of the digit keys from the key pad 6. Since no address key has been pressed yet, the system moves back to point A (FIG. 4A). When an address key has been pressed, the system follows through blocks 102-105 and 122-126, whereupon at block 127 the pressing of an address key is detected. In accordance with a preferred embodiment of the invention, each address in the RAM 34 is defined by a two-digit code. When a repertory key 8 is pressed both digits of such a two-digit code are produced; however, when abbreviated dialing is effected, the two-digit address must be derived by sequential pressing of two digit keys in the key pad 6. At block 128 the system determines whether both digits of an address code are present: if not, the system reverts to point A in FIG. 4A to await the next address digit; if so, the system sets up the address, block 129, of a particular memory location and telephone number stored in the RAM 34.

With the address now established, block 129, the system moves to point C in FIG. 4B, and the dial routine described above with reference to blocks 107-121 is followed to effect automatic dialing of the most significant digit of the addressed telephone number from the addressed memory location in RAM 34. When the system reaches block 121, however, it will discern that another number has been dialed; that number will not be from the key pad 6, block 121A, but rather will be from the addressed memory location in the RAM 34, block 121B, having bypassed through block 121C concerning last number dialed operation. The system, then, will proceed to point C again (FIG. 4B) to write the next most significant telephone number digit into an appropriate location in the LND memory area of the RAM 34, and the dial routine will proceed as described above for subsequent digits of the telephone number until a complete telephone number has been dialed.

If the function detected in block 105 (FIG. 4A) is the recording function, block 130, then the system proceeds to location E in FIG. 4D representing the record sub-routine. With the system accordingly in the record mode, block 131, the system 1 enters an address mode sub-routine via the negative response path of block 132, so that an address in the RAM 34 can be set up thereby to determine the location in the RAM 34 at which a desired telephone number is to be recorded or stored. The system looks to see whether an address key has been pressed, block 133. When an address key, either a repertory key 8 or a digit key from the key pad 6, has been pressed, the system 1 inquires whether both digits for a correct address code are present, block 134. If both digits are not present, then the system 1 proceeds through blocks 102-105, 122-124 and 130-133, the system 1 still being in a record mode, until the second digit is present. When both digits of the address are present, the address is set up, block 135, and the system and flow chart proceed back to location A. It will be appreciated that pressing of a single repertory key 8 provides both digits of an address code, say from 00 through 08 addresses. The next key ordinarily pressed will be a digit key in the key pad 6, whereupon the system 1 proceeds through the blocks 102-105, 122-124, 130-132, and since the system 1 is no longer in an address sub-mode of the record mode, the system detects that next key, block 136 (FIG. 4D). If that next key is a digit key, the digit is then stored in the addressed memory location in the RAM 34, block 137, and an end of file notation is written, block 138. The system 1 then proceeds back to point A in FIG. 4A to await detection of the next pressed key. The aforesaid operation will proceed until the entire telephone number desired is stored in the RAM 34. Thereafter, the record off key 21 is pressed and is detected at blocks 136 and 139. An end of file notation is written, block 140, in the addressed memory location of the RAM 34 and the system reverts back to point A in FIG. 4A.

In those instances that it is necessary to dial a certain code, such as the digit "9", to access a telephone trunk line, during the recording operation described just above, after the access code has been dialed, the wait key 22 may be pressed one or more times before the first most significant digit of the outside telephone number is recorded. Pressing of the wait key 22 causes a programmed wait period of, for example, two to four seconds to elapse between the time at which the access digit is dialed and the first most significant digit of the outside telephone number is dialed. During that wait duration, access to the telephone trunk line usually is obtained and the trunk line, accordingly, seized by the system 1. Also, during the wait period the system 1 turns on the speaker 16 so that the user can hear the obtaining of a dialtone indicating access and seizure of a trunk line.

In FIG. 4E the speaker sub-routine by which the operation of the speaker 16 proceeds in the system 1 is illustrated. As was mentioned above in connection with FIG. 4B, whenever the hand set is taken off hook, block 117, the speaker is turned off, block 118, this being effected by a setting of the speaker bit in the speaker latch circuit 60. However, if the speaker function generating key 24 is pressed, block 150, while the telephone handset is off hook, operation of the system 1 proceeds to point F in FIG. 4E. If that pressing of the speaker key 24 resets the speaker bit at the latch circuit 60, block 152, then the speaker is turned on, block 153, and the system returns to location A in the flow chart portion illustrated in FIG. 4A. However, if it is later desired to turn off the speaker, then subsequent pressing of the speaker key 24 sets the speaker bit, as sensed at block 152, and the speaker is turned off, block 154, after which the system reverts back to point A in FIG. 4A.

When the last number dialed function generating key 9 is pressed, the system 1 follows through flow chart boxes 102-105, etc. to block 160 of FIG. 4A. Then the flow moves to point F at block 108 in FIG 4B and through the dial routine, as above, to dial each digit. During the last number dialed operation, when block 121C is reached, the system flows back to point G, FIG. 4B, until the entire telephone number has been dialed with such number still being stored in the LND location of the RAM 34.

With the foregoing in mind, a detailed description of the circuitry employed in the telephone dialer system 1 will now be described with reference to FIGS. 5-8.

Turning now more particularly to FIG. 5, the CPU 30 may be, for example, a Model 4040 of Intel Corporation with an input/output circuit 43, a Model 4289 of Intel Corporation. The system clock 32 may be a Model 4201 of Intel Corporation with a timing crystal 200 coupled thereto to produce on lines 201, 202 a two-phase non-overlapping clock pulse signal in conventional manner. A reset line 203 between the system clock 32 and the CPU 30 provides a reset signal to the CPU on power up of the system 1. The power supply 31 preferably is a conventional switching regulator power supply with a battery back-up. The battery continues power to the system 1 to avoid losing information stored in the main system RAM 34 when there is a power failure. The security switch 15 is connected between the CPU 30 and clock 32 to provide to the latter a 5-volt power signal. However, when the index 13 is removed from the system case 3, switch 15 will be thrown to connection with a terminal 204 to provide a supply of negative voltage to the system clock 32, thus disabling the same and the system 1 until the index is replaced in proper position. A power up reset circuit 205 provides delayed power up control of the system clock 32 in conventional manner when the power supply 31 is first energized, and an RC decoupling circuit 206 coupled to the system clock eliminates transients and other noise from affecting the clock signals produced thereby.

When a keyboard interrupt signal is received on line 40, the interrupt circuit 41 produces an interrupt signal on line 42 for interrupting operation of the CPU 30 causing the same to interrogate the keyboard. The interrupt circuit includes an input RC circuit 207, a NAND gate 208, and a conventional flip flop circuit 209 (RCA Model 4013), which is set to produce the interrupt signal on line 42 when the keyboard interrupt signal is received on line 40. Moreover, an interrupt acknowledge circuit 210, which includes a NAND gate 211 provides an acknowledgement signal on line 212 from the CPU when the latter has received an interrupt signal. The acknowledgement signal on line 212 will reset the flip flop 209 making it ready for producing a subsequent interrupt signal when the next keyboard signal is received on line 40.

The two-phase clock signal and the reset signal from lines 201-203 are provided to both the CPU 30 and the input/output circuit 43 to assure synchronous operation thereof, and a further synchronizing line 213 provides a synchronizing pulse signal that has, for example, a frequency of about ⅛ that of the respective clock pulse signals, the synchronizing pulse on line 213 providing conventional synchronizing function of the CPU 30 with the input/output circuit 43. An internal data bus of four lines 214 communicates data between the CPU 30 and input/output circuit 43. As is well known, of course, in response to signals developed in the CPU 30 the input/output circuit 43 will produce on a series of address lines forming address bus 63 address signals that will address selected memory locations in the ROM 33, such as an Intel Corporation Model 8316E, and RAM 34 such as an Advanced Micro Devices Model 91L30. Programmed information from the ROM 33, then, when the latter is addressed, will be delivered on program output lines 216 to the input/output circuit 43 and subsequently to the CPU 30 causing the latter to take further action. Whenever the CPU 30 requires input information through the input/output circuit 43, a command signal is produced on line 220 and delivered to the command input 221 of the input/output circuit 43. The command signal on line 220 thus coordinates activity of the CPU 30 and input/output circuit 43. To produce the command signal the CPU 30 has two ROM select output terminals 222, 223, which according to prior convention have been utilized to enable one or another ROM to deliver program information to the CPU 30. In the present invention, however, the two ROM select terminals 222, 223 are combined in the command signal logic circuit 54, which includes a NAND gate 224 and an inverting amplifier 225 to produce the command signal on line 220. The pulse format of the ROM select signals produced at the terminals 222, 223 is so selected that the command signal on line 220 will be produced whenever it is necessary to command operation of the input/output circuit 43 to deliver information to the CPU 30.

An important aspect of the present invention is a novel use of the ROM select signals produced at the ROM select terminals 222, 223. In particular, those signals are delivered to the output logic circuit 52, which includes a pair of NAND gates 226, 227 connected as a conventional latch circuit. By setting and resetting the latch, then, according to the ROM select signals, a dial pulse signal is produced on line 228 in an appropriate format for operating the dial pulse relay 53 to dial a telephone number. The line 228 is connected via a transistor 229 and a further line 230 directly to the dial pulse relay 53.

In the decode output logic circuit 45 a conventional latch circuit 231, such as an RCA Model 4042, receives information on decode output lines 232 from the CPU 30, such as from the RAM 1, 2, 3 terminals thereof, and effectively prolongs the duration of such signals on latch output lines 233. A NAND gate 234 provides a clock input signal to the latch circuit 231 in response to signals from the system clock 32, received on line 235, and the NAND gate 224 in the command signal logic circuit 54, on line 236. The signals on lines 232 and 233 are in a coded format, and the decode output logic circuit 45 also includes a conventional one of eight decoder circuit, such as an Advanced Micro Devices Model 25LS138, which decodes the information from lines 233 and outputs the same on one of the eight decoder output lines 238 thereof. An AND gate 240 connected to several of the decoder output lines 238 provides at its output 241 a RAM chip select signal delivered to the chip select terminal 242 of the RAM 34 whenever it is desired to enable the latter to record or to read out information stored therein. A pair of NOR gates 243, 244 also are connected to several of the decoder output lines 238 to produce on lines 245, 246 additional address signals cooperative with the address signals received on the address bus 215 for addressing certain memory locations within the RAM 34.

Also connected to several of the decoder output lines 238 in the logic circuit 45 are three OR gates 247-249. The OR gate 247 is connected by line 250 to the audio latch circuit 59, such as an RCA Model 4042 circuit, to provide a clock signal thereto allowing setting and resetting of the outputs thereof. The OR gate 248 is connected via line 252 to provide a clock signal to the scanning latch circuit 46 in the display energizing circuitry 61. Moreover, the OR gate 249 is connected by line 253 to the buffer circuit 49 to enable the same to cooperate with the scanning latch circuit 46 during interrogation of the keyboard 4.

The system data bus 50 includes four lines 260-263 which are connected between the input-output ports or terminals of the input/output circuit 43 and the RAM 34. The system data bus 50 also is connected to the audio latch 59, as shown in FIG. 5. A reference voltage source 264, such as a plurality of 1 K resistors coupled to a reference voltage potential, is provided for the data bus. When it is desired to read information from the RAM 34, a read signal is provided from the read output terminal 265 of the input/output circuit 43 via line 266 to a read input terminal 267 of the RAM 34. Moreover, to complete a read operation, a clock pulse signal also is provided to the clock input 268 of the RAM 34 via an AND gate 269 and a NAND gate 270. Line 271 is connected to the power supply 31. The purpose of such connection is to provide a disable signal on line 271 preventing a clock signal delivery from the AND gate 269 when the output voltage of the power supply 31 drops below a minimum level. When it is desired to write information into a memory location within the RAM 34, a write signal is produced on the write output line 272 of the input/output circuit 43, and that write signal is supplied via line 273 and logic circuit 274 to the write input 275 of the RAM 34. The write logic circuit 274 includes a dual input NAND gate 276 and an inverting amplifier 277. If desired, a connection 278 to provide a continuous supply of voltage to one input of the NAND gate 276 may be provided selectively, for example by an additional switch on the keyboard 4, effectively to disable the write logic circuit 274 from enabling the write terminal 275 of the RAM 34. Therefore, when the switch connection 278 is made, it will be impossible to write over telephone numbers already stored in the RAM 34. The read line 266 also is connected to the OR gate 249, and the write line 273 is connected to the OR gates 247 and 248. The write line 273 also is connected to one input of the NOR gate 72 in the enabling circuit 71 for the display energizing circuitry 61.

Referring in detail now to FIG. 6, the lines 260-263 of the system data bus 50 are connected to the RAM 65, which may be an Advanced Micro Devices Model 91L01. One group of four lines 280 from the address bus 63 is connected to one portion 62a of the multiplexer 62 and another group of four lines 281 from the address bus 63 is connected to a second portion 62b of the multiplexer 62. Each of the multiplexer portions 62a, 62b may be, for example, an RCA Model No. 4019 multiplexer circuit. Each of the multiplexer portions 62a, 62b is connected by multiplexer lines 282, 283, respectively, to the RAM 65. Moreover, the binary counter circuit 64 includes a conventional oscillator circuit 284 and a conventional binary counting circuit 285, which may an RCA Model No. 4520. The binary counting circuit 285 continuously counts from zero through 15, i.e. 16 total counts, and produces binary coded count information on coded count lines 286 representing the count level achieved at any given time. The coded count lines 286 are coupled to the multiplexer 62 at the portion 62b, and the latter provides information representative of the coded count information via line 287 to the multiplexer 62a. Moreover, the coded count lines 286 are connected to the binary decoder digit select circuit 70, which includes, for example, two portions 70a, 70b, each of which may be an Advanced Micro Devices Model No. 25LS138. The circuits 70a, 70b are one of eight decoders used in a parallel manner to obtain 16 distinct enabling output signals on 16 lines 288 that are connected to the 16 respective display elements in the display 11. Therefore, as the binary counter 64 produces its 16 distinguishable counts, the 16 enabling lines 288 will be selectively operated by the digit select circuit 70 to enable respective display elements in the display 11 in synchronism with the sweeping of the multiplexer 62.

To write information into the RAM 65, there must be a signal on line 290 coupled to an output of the one of eight decoder 237 which is used as a chip select signal to enable the multiplexer circuits 62a, 62b to receive information from the CPU 30 and input/output circuit 43 on the address lines 280 and 281. When the chip select signal on line 290 is removed, an inverting amplifier 291 delivers a disabling signal on line 292 to the multiplexer circuit portions 62a, 62b preventing them from receiving information on the address bus lines 280, 281; when the multiplexer circuit portions are so disabled, the binary coded information on the coded count lines 286 from the binary counter 64 are delivered via the multiplexer lines 283 to the RAM 65 in order to cause a sweep-like reading of the respective memory locations thereof. Thus, to store or write information in the RAM 65, there must be present a chip select signal on line 290, and there also must be present a write signal on line 273, which operates the enabling circuit to produce an enabling signal on line 74. Thereafter, according to the information contained on the address bus lines 280, 281 and on the system data bus 50, telephone number information will be stored at respective locations within the RAM 65. When the chip select signal is removed from line 290, then the information stored in the RAM 65 will remain effectively undisturbed.

The decode latch multiplex control circuit 75, such as RCA Model 4042, receives input information from the system data bus 50, from the enabling circuit line 74, and from the address bus line 293, which is connected via an inverting amplifier 294 to a NOR gate 295 for combining with the enabling signal from line 74. When it is desired to enable the RAM 65 to effect displaying of a telephone number stored therein by the display 11, the decode latch multiplex control circuit 75 produces a signal on line 296, thereby enabling the RAM 65 to read out information as it scanned or swept via the binary counter 64 and multiplex control portion 62b.

There are four data lines 66 which provide binary coded decimal information from the RAM 65 to the binary coded decimal seven segment driver decoding 68, which may be an RCA Model No. 4511. Connected to the data line 66 is a cancel circuit 300, which may be an RCA Model No. 750-61-15K. Such circuit 300 may be a plurality of resistors respectively connected between a reference voltage potential, such as a 5-volt source, as indicated, and the respective data lines 66 to hold those lines at such reference voltage when no other signal is delivered thereto. By holding the lines at the indicated voltage, the display elements in the display 11 will be disabled. Accordingly, the RAM 65 preferably is a tri-state output device to eliminate, when operating, the disabling effect of the cancel circuit 300. Therefore, when enabled by the decode latch multiplex control circuit 75 by a signal on line 296 and scanned by the binary counter 64 and multiplexer circuit portion 62b, the RAM 65 will sequentially produce binary coded decimal information on the data line 66 representative of the segments to be energized in the display 11 to present information representing respective digits being dialed by the system 1. The information on data lines 66 is decoded by a binary coded decimal seven segment driver circuit 68, which may be, for example, an RCA Model No. 4511, that produces on its seven output lines energizing signals, which are limited by respective resistors in the current limit circuit 69, such as an RCA Model No. 760-3-470 ohm seven resistor pack, to energize the respective segments 11'. As the binary counter 64 produces its output information on the coded count lines 286 to effect the mentioned scanning or sweeping of the RAM 65, such information also effects a scanning or sweeping type enabling of the respective display elements in the display 11. The information on the coded count lines 286, more particularly, is delivered to respective sections 70a, 70b of the binary decoder digit select circuit 70, each section of which may be an Advanced Micro Devices one of eight decoder Model No. 25LS138. The decoders, then, selectively enable the respective 16 display elements of the display 11 as the 16 storage locations in the RAM 65 also are scanned. In this manner the respective segments 11' of the several display elements are sequentially energized to produce a visual display of the telephone number dialed.

It will be appreciated that if only the first most significant digit is stored in the RAM 65, say after only one of the digit keys in the key pad 6 has been pressed in a manual dialing mode, only that digit will be displayed in the display 11, and such display will occur as the least significant display element 11A. When the next digit of a multiple digit telephone number is pressed on a digit key of the key pad 6, that next digit will be stored in the RAM 65 and that digit also will be displayed in the display 11 at the least significant location while the first digit is shifted one place to the next most significant location.

When a telephone called by the telephone dialer system 1 is answered, input information to the decode latch multiplex control circuit 75 removes the enabling signal from line 296 thereby disabling the RAM 65; briefly produces a reset pulse on line 301, which is delivered via reset lines 302, 303 to respective reset terminals of dual binary coded decimal counters 76a, 76b, such as RCA Model No. 4518 counters, to reset the same at zero; delivers a clock terminal energizing signal on line 304 to enable the counter 76a; and produces an enabling signal on line 305 for use in connection with the first four enabling output signals produced on the enabling lines 288 from the binary decoder digit select circuit 70a to enable selected portions of buffer circuits 78a, 78b, 78c of the buffer stage 78, which directly provide counted time information to the display 11 via the decoder driver 68. A pulse forming circuit 306, such as an RCA Model No. 4040, receives an input 60 Hz signal, for example, and produces on line 307 a 1 Hz. signal that is counted by the dual binary coded decimal counter 76a. The counter 76a counts from zero through 59 and then resets itself to start counting at zero again. Each time the counter 76a resets itself, it produces an output pulse on line 308 causing the binary coded decimal counter 76b to increment its count by one. The counter 76b counts from zero through 99 and then resets itself to start counting at zero again. Thus, it will be appreciated that the counter 76a counts the seconds and the counter 76b counts the minutes of the duration of a telephone call.

Each of the buffer circuits 78a, 78b, 78c, such as National Semiconductor Model 80C97, preferably is a tri-state device having its buffer output lines 310 connected to the data lines 66. Moreover, via a series of four NOR gates 311 and a series of inverting amplifiers 312, different respective buffers 78a, 78b, 78c are enabled in response to scanning enabling output signals produced by the binary decoder digit select circuit portion 70a at the same time that such signals selectively sequentially enable the four display elements in the group 313 of display elements. Accordingly, the information contained on the buffer output lines 310, which is preferably in binary coded decimal format, is decoded by the driver circuit 68 and delivered, as above, to energize respective segments of the display 11. Of course, as above, only the segments of the selectively enabled display elements of the group 313 will actually be energized to emit light as they are respectively scanned by the digit select circuit 70a. A line 314 from NOR gate 311A provides a signal from the latter periodically to operate a transistorized circuit 315 which energizes a display element 316 representing a decimal point. Accordingly, the display energizing circuitry 61 and display 11 will operate to display the total time duration of the telephone call in minutes and in hundredths of minutes up to a total, for example 99.99 minutes.

At the conclusion of a telephone call, moreover, the enabling signal on line 304 will be terminated to stop further counting in the counter 76. However, the count then present in the counter 76 will continue to be displayed, as aforesaid, until reset by a reset signal on line 301 from the decode latch multiplex control circuit 75. Moreover, a manual time reset signal can be provided on line 80 from the timer reset switch 10 to reset the counter 76 to zero either during a telephone call or after termination thereof.

Set and reset lines 320, 321 from the audio latch circuit 59 (FIG. 3) are connected to deliver set and reset signals to the audio latch 60 (FIG. 6), which may be an RCA latch circuit No. 4042. When the latch 60 is set, a transistor 322 is biased to conduction to effect energization of the speaker relay 56 from a source of positive voltage 323. Regulation of that positive voltage is provided by a resistor 324 and a zener diode 325. Upon energization of the speaker relay 56, normally open contacts 56-1 and 56-2 are closed. Lines 326, 327, then, which are connected across the secondary of the usual transformer in the telephone, provide the audio signal therefrom through the closed contacts 56-1 and potentiometer 328 of the volume adjust 17. By adjustment of the wiper arm 329 of the potentiometer 328, the magnitude of the signal delivered to an audio amplifier 330, such as a National Audio amplifier Model No. LM380, is adjustable. The output signal from the amplifier 330 is delivered via line 331, capacitor 332 and closed contacts 56-2 to the speaker 16, which is connected across lines 333, 334.

Figure 7A:
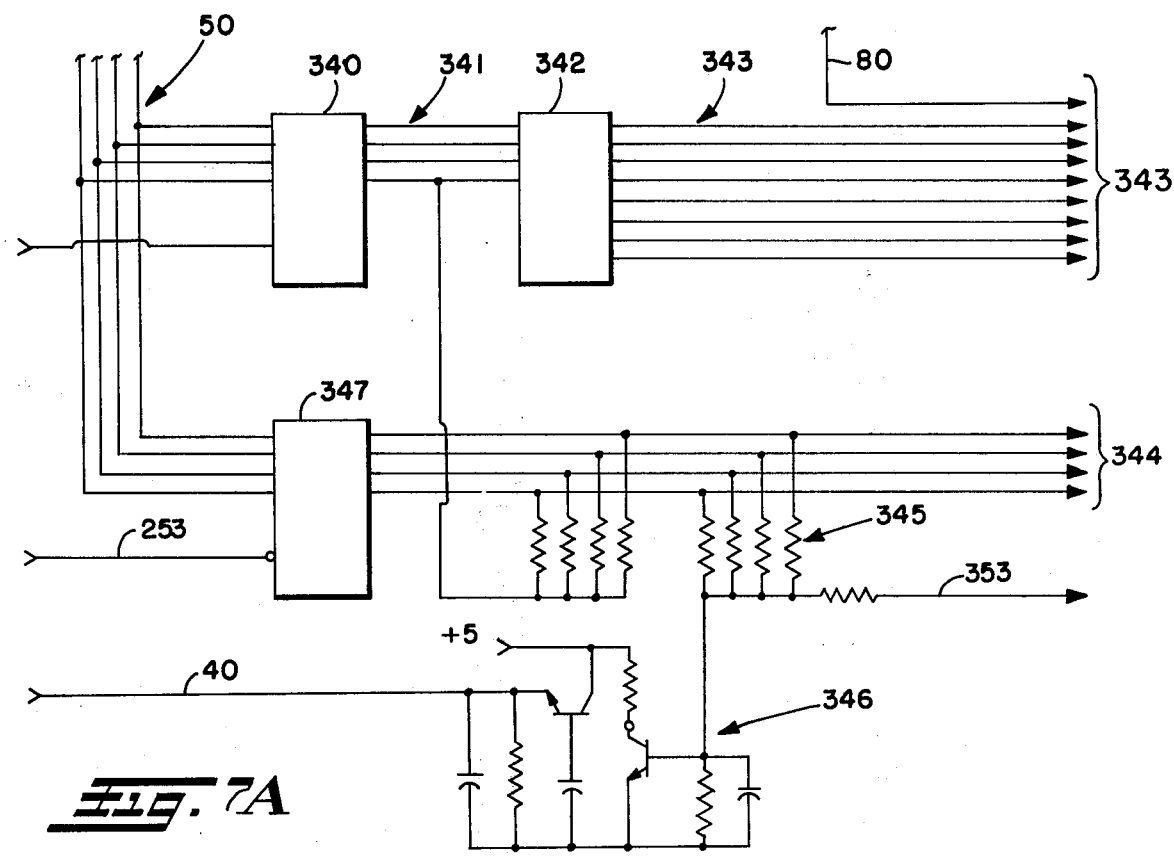
FIG. 7A is a schematic circuit diagram of the keyboard decoding circuit.
Figure 7B:
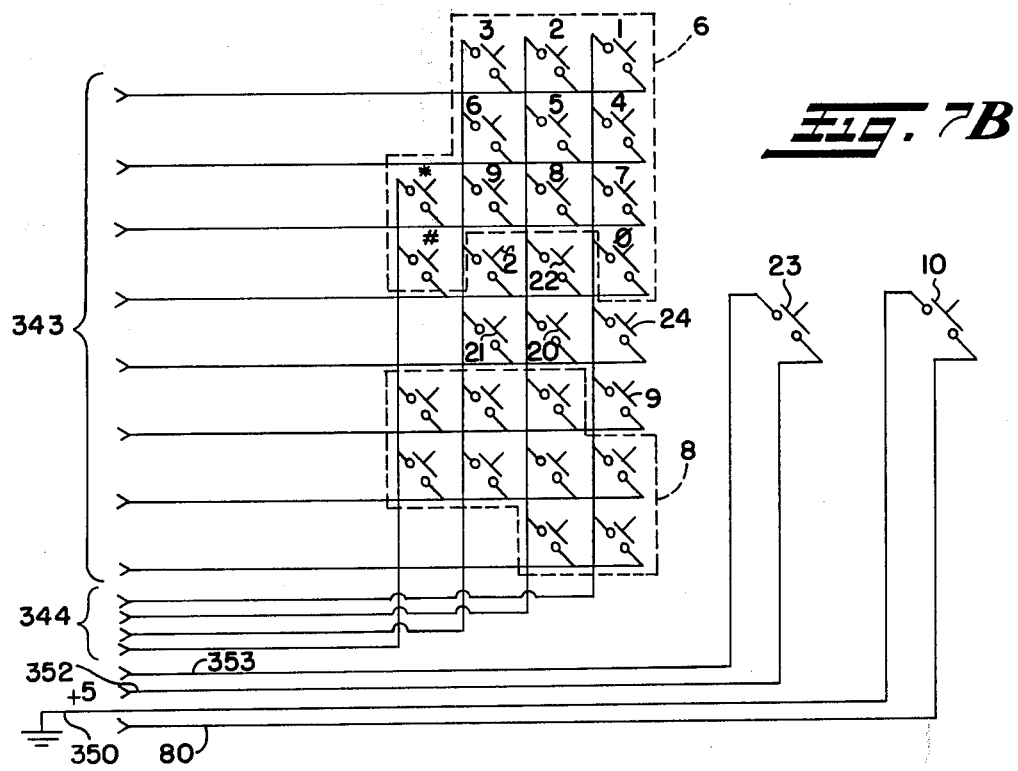
FIG. 7B is a schematic electric circuit diagram of the keyboard and key pushbutton switches thereof.
Figure 9:
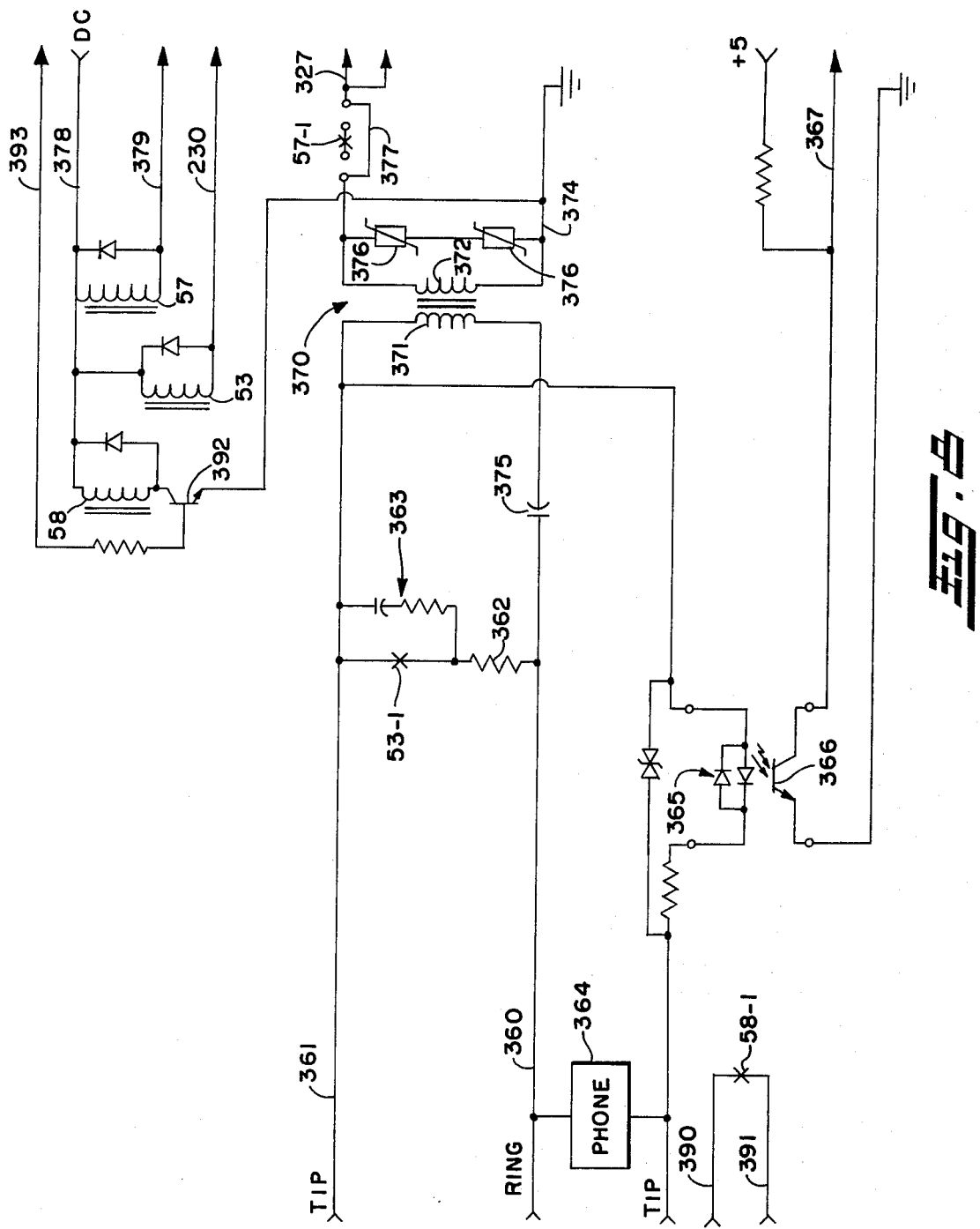

Referring now in detail to FIGS. 7A and 7B, the system data bus 50 is connected to a latch circuit 340, such as RCA Model No. 4042, which produces coded information on its output lines 341 that are coupled to a one of eight decoder circuit 342, such as an Advanced Micro Devices Model No. 25LS138. The eight scanning lines 343 from the decoder 342 are connected to respective lines 343 shown in FIG. 7B associated with the switches corresponding to the keys described above of the keyboard 4. Normally each of the scan lines 343 is at a relatively high potential unless the line is being scanned under control of the CPU 30 and input/output circuit 43, as described above, during which respective lines are sequentially brought to a low signal level to interrogate the keyboard 4. When any of the keys on the keyboard, other than the cancel key 23 or timer reset key 10, is pressed, the high signal on one of the scan lines 343 is transferred via key output lines 344 and one of a group of resistors 345 to a key interrupt generating circuit 346. The circuit 346 is transistorized and produces a positive key interrupt signal on line 40 to generate the CPU interrupt signal at the interrupt circuit 41, as aforesaid. The CPU 30 then effects scanning of the keyboard 4 by sequentially causing respective scan lines 343 to become relatively negative or zero potential, and when there is a change in the potential of any of the key output lines 344, then, such change is an indication that the pressed key has been found. Such low signal, moreover, is amplified by a buffer circuit 347, such as a Motorola Model No. 14502, which, during the interrogation period, is enabled by a signal delivered on line 253 from the OR gate 249 (FIG. 5). Such enabling occurs only during the interrogation period.

Whenever the timer reset key 10 is pressed, a low signal from line 350 is delivered via line 80 to the NAND gate 351 in the timing portion of the display energizing circuitry 61 (FIG. 6) to reset the counter 76 as above. Moreover, whenever the cancel key 23 is pressed, a high or positive potential signal from line 352 is delivered via line 353 to generate both a key interrupt signal on line 40 and to bring high all of the key output lines 344. The information that all the key output lines 344 are high is transferred via the buffer 347 and the system data bus 50 back to the input/output circuit 43 and CPU 30 indicating that the cancel function has occurred, thereby causing the system 1 to reset itself, as aforesaid.

Referring now in detail to FIG. 8, the interface circuit to the telephone 38 is illustrated in detail. The interface circuit includes the conventional ring and tip lines 360, 361, which are connected to the telephone company service lines. Connected across the ring and tip lines is a series circuit of normally open dial pulse relay contacts 53-1 and resistive impedance 362, and across the dial pulse relay contacts in conventional manner is an RC transient suppression circuit 363. Whenever a telephone line circuit is seized, as mentioned above, the dial pulse relay 53 is energized by the telephone dialer system 1 to close contacts 53-1 placing the impedance 362 across the ring and tip lines. Similarly, whenever the telephone is taken off hook, it places its impedance, which is represented at 364, across the ring and tip lines to complete a circuit path therebetween and thereby to cause light emitting diodes 365 to effect conduction in a light responsive transistor 366. The conductive transistor 366 provides information on line 367 back to the CPU 30 to indicate that the phone is off hook, whereupon the CPU 30 maintains the dial pulse relay 53 energized except during a dialing operation, either directly by manual operation of the telephone key pad or automatically by the above described repertory and/or abbreviated dialing operation of the telephone dialer system 1.

The telephone transformer 370, including a primary 371 and a secondary 372, connects the audio information in the telephone lines 360, 361 to the telephone speaker system via lines 373, 374. A capacitor 375 blocks DC signals. A pair of varistors 376 may be used in connection with the pushbutton type telephone to limit voltage to the electronics thereof. Line 373 is connected via a jumper 377 to line 327, which is in turn connected to the potentiometer 328 for delivering the audio signal to the amplifier 330 and speaker 16 when the audio signal is received by the transformer 370. If desired, connection between the lines 373 and 327 may be made via the normally open contacts 57-1 which are operated by the muting relay 57. More particularly, the muting relay 57 is connected to a source of positive potential at line 378 and is selectively energized by connection to a source of ground potential via line 379 and a muting relay energizing transistor 380 (FIG. 5), conduction in which is controlled by the audio latch circuit 59.

As was described above, operation of the dial pulse relay 53 is effected directly from the CPU 30 via the latch circuit 52. When the latch circuit 52 delivers a relatively high signal on line 228, the latter brings drive transistor 229 to conduction. The conductive transistor 229 couples a source of ground reference potential to line 230 (FIGS. 5 and 8), which completes the circuit for energizing the dial pulse relay 53. By periodically briefly removing the high signal from line 228 to deenergize the relay 53, the contacts 53-1 will open briefly and dialing type operation will be effected.

When it is desired to utilize a light type signaling function on a telephone, such a light function is generally controlled directly from a line card in a control panel remotely located from the telephone. However, in order to make such a light function operate in response to the telephone dialer system 1, lines 390, 391 for such light function are interrupted by normally open light operating contacts 58-1. The contacts 58-1 are controlled by the light relay 58, which, as illustrated, is driven by a transistor 392. When a biasing signal is received on line 393 from the audio latch 59 (FIG. 5) the transistor 392 is biased to conduction to energize the light relay 58, which, in turn, closes the contacts 58-1 to energize the light function circuit under final control of the line card.

STATEMENT OF INDUSTRIAL APPLICATION

In view of the foregoing, it will be appreciated that the telephone dialer system 1 in accordance with the present invention may be utilized to provide multiple automatic function control of conventional telephone equipment, thereby to facilitate dialing operation, display of telephone number information, and timing of telephone conversation duration.

The embodiments of the invention in which an exclusive property or privilege is claimed are defined as follows:

1. A microprocessor based automatic dialing system for telephone equipment, comprising first memory means for storing information at plural addressable locations representing plural respective telephone numbers, a central processor unit, second memory means for storing program control information for controlling said central processor unit to read out selected information from said first memory means, said central processor unit including command output means for periodically producing command signals commanding the input of information to said central processor unit, and decoding means coupled to said command output means for producing a dialing pulse in response to signals over said command output means.

2. The system of claim 1, said first memory means comprising a random access memory.

3. The system of claim 1, said second memory means comprising a read only memory.

4. The system of claim 3, said command output means comprising read only memory select output terminals of said central processor unit.

5. The system of claim 4, said decoding means comprising latch circuit means responsive to said command signals for producing respective output states in response thereto.

6. The system of claim 5, further comprising dial pulse relay means for producing a dial pulse, and means for operating said dial pulse relay means in response to the respective states of said latch circuit means.

7. An automatic dialing system for telephone equipment, comprising a central processor unit, first memory means for storing program control information to control operation of said central processor unit, second memory means for storing information at plural addressable locations representing plural respective telephone numbers, including a distinctly addressable last number dialed location, output means for producing telephone dialing information to effect dialing of a telephone, input means for selecting a telephone number to be so dialed, said central processor unit and first memory means being cooperative in response to said input means to write the information representing the selected telephone number from the addressed location in said second memory means to said last number dialed location and to control said output means only in response to information stored in and delivered from said last number dialed location.

8. The system of claim 7, said central processor unit comprising a microprocessor.

9. The system of claim 7, said first memory means comprising a read only memory.

10. The system of claim 7, said second memory means comprising a random access memory.

11. The system of claim 7, said output means comprising a dial pulse relay and means for pulsing said dial pulse relay in response to said central processor unit to effect production of a dial pulse on a telephone line.

12. The system of claim 7, said input means comprising a keyboard including a plurality of selectively actuatable keys thereon, scanning means controlled by said central processor unit for scanning said keyboard to determine a key actuated thereon and effecting dialing of a telephone number in response thereto.

13. The system of claim 12, said keyboard including a plurality of repertory dialing keys for one button dialing of such telephone equipment, a key pad, and a last number dialed function operating key, said central processor unit being responsive to actuating of a repertory dialing key for one button dialing of such telephone equipment, said central processor unit being responsive to coded information generated by actuation of plural keys from said keyboard to effect abbreviated automatic dialing of such telephone equipment, and said key pad being actuatable for manually dialing a telephone number.

14. A dialing system for telephone equipment, comprising repertory dialing means for one button dialing of such telephone equipment when the system is enabled, selectively actuatable abbreviated dialing means for generating coded information to effect dialing of such telephone equipment when the system is enabled, said abbreviated dialing means including key pad means for generating such coded information and for manually dialing a telephone number, selectively operable function generating means for distinguishing whether information generated by said key pad means represents coded information to effect abbreviated dialing or manual dialing information, whereby said key pad means may be used for both abbreviated dialing and manual dialing and said repertory dialing means may be used for one button dialing, first memory means for storing information at plural addressable locations representing plural respective telephone numbers, a central processor unit, second memory means for storing program control information for controlling said central processor unit to read out selected information from said first memory means, said central processor unit including command output means for periodically producing command signals commanding the input of information to said central processor unit, and decoding means coupled to said command output means for producing a dialing pulse in response to signals over said command output means.

15. The system of claim 14, wherein said decoding means comprises a latch circuit.

16. The system of claim 15, further comprising dial pulse relay means for producing dial pulses in an accessed telephone line, and means for controlling said dial pulse relay means for response to the output of said latch circuit.

17. A dialing system for telephone equipment, comprising repertory dialing means for one button dialing of such telephone equipment when the system is enabled, selectively actuatable abbreviated dialing means for generating coded information to effect dialing of such telephone equipment when the system is enabled, said abbreviated dialing means including key pad means for generating such coded information and for manually dialing a telephone number, selectively operable function generating means for distinguishing whether information generated by said key pad means represents coded information to effect abbreviated dialing or manual dialing information, whereby said key pad means may be used for both abbreviated dialing and manual dialing and said repertory dialing means may be used for one button dialing, a central processor unit, first memory means for storing program control information to control operation of said central processor unit, second memory means for storing information at plural addressable locations representing plural respective telephone numbers, including a distinctly addressable last number dialed location, output means for producing telephone dialing information to effect dialing of a telephone, input means for selecting a telephone number to be so dialed, and wherein said central processing unit and first memory means are cooperative in response to said input means to write the information representing the selected telephone number from the addressed location in said second memory means to said last number dialed location and to control said output means only in response to information stored in and delivered from said last number dialed location.

18. The system of claim 17, wherein said central processor unit comprises a microprocessor.

19. The system of claim 18, wherein said first memory means comprises a read-only memory and said second memory means comprises a random access memory.

20. The system of claim 19, further comprising display means for displaying the telephone number dialed by the system.

21. The system of claim 17, further comprising last number dialed recall means for initiating redialing of the telephone number stored in said last number dialed location by operation of only a single key.

22. A dialing system for telephone equipment, comprising repertory dialing means for one button dialing of such telephone equipment when the system is enabled, selectively actuatable abbreviated dialing means for generating coded information to effect dialing of such telephone equipment when the system is enabled, said abbreviated dialing means including key pad means for generating such coded information and for manually dialing a telephone number, and selectively operable function generating means for distinguishing whether information generated by said key pad means represents coded information to effect abbreviated dialing or manual dialing information, whereby said key pad means may be used for both abbreviated dialing and manual dialing and said repertory dialing means may be used for one button dialing, and index means for storing information concerning the telephone numbers stored in the system, a housing for the system, and connecting means for removably connecting said index means to said housing thereby facilitating selective connection and removal of said index means to the dialing system housing.

23. The system of claim 14, further comprising security means responsive to the presence of said index means on the dialing system for disabling the system when said index means is removed.

* * * * *